July 1, 1941.   E. GILBERT   2,247,995
ANTIFRICTION JOURNAL BEARING
Filed Nov. 4, 1937
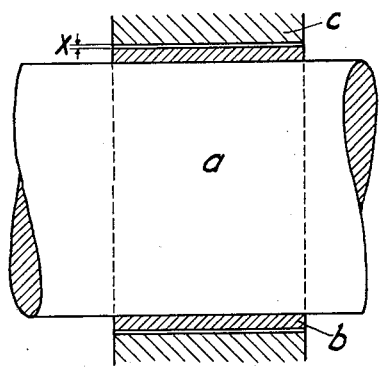
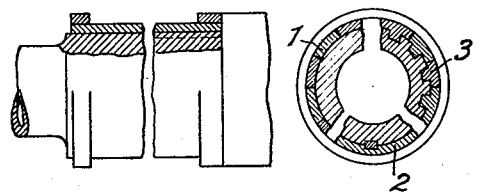 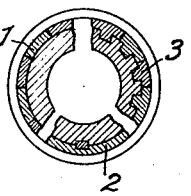
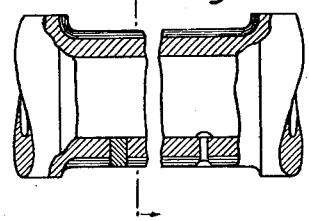 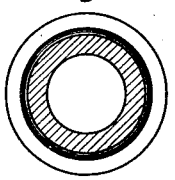
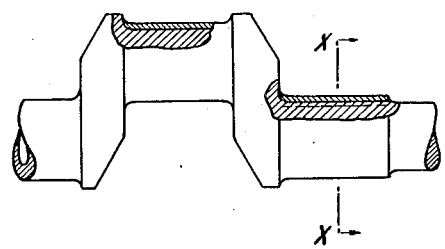 
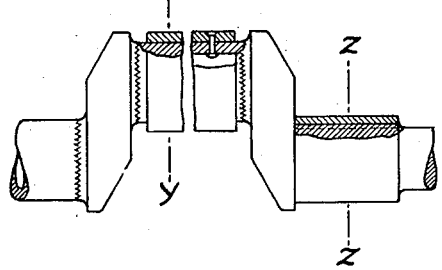 
Inventor
Ernst Gilbert
by his attorneys
Howson and Howson Patented July 1, 1941

2,247,995

UNITED STATES PATENT OFFICE 2,247,995

ANTIFRICTION JOURNAL BEARING

Ernst Gilbert, Berlin-Oberschoneweide, Germany

Application November 4, 1937, Serial No. 172,825
In Germany November 9, 1936

3 Claims. (Cl. 308—238)

The journalling of shafts in so-called "plain" bearings (as distinguished from ball or roller bearings) has, as is well known, hitherto been effected by bedding in the steel shaft journals to bearing surfaces formed in certain specific materials, usually termed "antifriction materials" (for instance white metals, lead-tin alloys, bronzes, light metals, cast iron, artificial resins and so on) which are cast in, screwed on, riveted in place or otherwise affixed either to a bearing liner surrounding the journal or to the actual casing or body of the bearing.

In order to obtain satisfactory antifriction properties considerable difference in hardness of the surfaces running in contact with each other is aimed at. Moreover, in order to reduce wear on the shaft journals, the journal surfaces are frequently heat treated or case hardened but this often involves the use of auxiliary substances, greatly increases the cost of production and makes the provision of substitutions more difficult.

An advantage is afforded by the easy interchangeability of the liners carrying the softer antifriction material and the possibility of testing different kinds of antifriction materials, so that those materials which, by reason of easy moldability, good running properties and/or good heat conductivity, are best suited to given operating conditions can be used without any substantial constructional alterations.

In the case of antifriction materials of low heat conductivity, as applied to ordinary constructional arrangements of bearings, a considerable amount of heat can easily accumulate in the antifriction layer, especially if the liners completely surround the shaft, leaving no cooling surfaces on the shaft or inside the liner to permit of adequate removal of the heat by means of a lubricating agent or by auxiliary cooling means. The consequent rise in journal temperature and the attendant thermal expansion of the shaft, frequently cause the bearings to overheat to such an extent that they seize or, in the alternative excessive clearance has to be provided, in which a large quantity of lubricant has to be kept in circulation in order to abstract the heat adequately and to maintain the necessary pressure in the lubricating system.

In addition to this, the increased freedom of movement of a shaft which has excessive clearance in its bearings sets up increased percussive stresses on the antifriction materials under changes of load while permitting the shaft to whip considerably and to run only on edge portions of the bearing surfaces.

It is an object of the present invention to improve and facilitate the construction of antifriction journal bearings of the kind referred to by applying the antifriction material directly or indirectly to the journal zone of the shaft so that the antifriction surface moves with the shaft and is in running contact with an internal bearing surface, instead of constituting, in itself, an internal bearing surface, as in known constructions wherein the antifriction material is fixed inside a bearing casing or bearing liner, or else takes the form of a floating sleeve.

The accompanying drawing illustrates diagrammatically in Figure 1 an antifriction journal bearing embodying the basic features of this invention. In Figures 2 to 9 are shown some practical embodiments of the invention.

As will be seen in Figure 1 on the shaft $a$ is fixed the antifriction material $b$ which runs in the body $c$ of the bearing. $x$ denotes the usual running clearance.

Figure 2 shows a crank-shaft, in the central portion of which the antifriction material is secured to the shaft, in that it has been cast in raw condition about the said shaft, in which case the shaft must be imagined to be smooth. In the right hand moiety of Figure 2 is represented an attachment of the antifriction material in such a manner that the shaft is provided with notches or little teeth, enabling the antifriction material cast about said shaft to enter in intimate connection with said shaft owing to said teeth.

Figure 3 is a cross section along line $x$—$x$ of Figure 2.

Figure 4 likewise represents a crank-shaft upon which the antifriction layer is shrunk and secured to it, for instance, by rivets.

Figure 5 shows a cross-section in its upper half along line $y$—$y$ of Figure 4, and in its lower half along line $z$—$z$, and for the connection of the antifriction material to the shaft notches or teeth are again provided. For the rest, the antifriction material is shrunk upon the shaft in this instance too.

Figure 6 illustrates another variation at some other kind of shaft, in which the antifriction material is held by shrinking rings drawn over a sleeve of antifriction material consisting of one or a plurality of parts.

In Figure 7, being a section of the foregoing figure, are shown three different ways in securing the antifriction material. On the one hand, part 1, will suffice the locking of the said material by means of the shrinking rings alone, while in part 2 is indicated, in which way the antifriction material can be secured through a rivet with a pin, and in part 3 is indicated the locking of the material by means of notches and teeth. In part 1 and 3 the antifriction material is applied in the form of a sleeve consisting of a plurality of parts, which sleeve is held by the shrinking rings, while in part 2 of Figure 7 one may imagine a sleeve consisting of a single part.

Figures 8 and 9 show in longitudinal and cross-section antifriction material consisting of a winding of a band made from some synthetic material (tissue, paper or veneers), which is prevented from rotation by being glued to the metal surface. In addition there may also be provided as means against displacement yet some pins or rivets made of some synthetic substance, and so on, as is indicated in the lower half of Figure 8.

A bearing arranged in accordance with this invention has the advantage that the selection of the shaft material and the treatment of the journal surface or surfaces of the shaft need no longer be restricted by requirements of high surface quality, hardness of running surfaces and so on; consequently the shaft materials can be chosen solely in view of other properties, important from the standpoint of dynamic stresses, such as toughness, resistance to scoring, damping qualities and so on.

Even though, in many cases, the liners have to be subjected to the same sort of treatment as would otherwise have to be applied to the shaft in order to produce a good running surface, the work involved is reduced to an infinitesimally small amount as compared with corresponding steps in the manufacture of the shaft. The usual advantage of interchangeability of the different substances running in contact with each other is still retained in the arrangement forming the subject matter of the present invention.

When using antifriction materials which are bad conductors of heat, particularly artificial substances, the new arrangement essentially affords means for overcoming the difficulties which have hitherto arisen owing to the accumulation of heat in the bearing. By locating the antifriction layer on the external periphery of the annular body constituted by the heat insulating substance, the shaft is protected from excessive heating and so much of the heat due to friction as cannot be carried off by the lubricant has to be conducted away by the external surrounding liner or by the casing. In the case of rapid thermal changes in the superficial layer of the rotating member the radial play in the bearing is automatically increased by just as rapid an expansion of the surrounding liner shell until thermal equilibrium is established by increased flow of lubricant through the bearing and increased abstraction of heat therefrom. As a consequence the construction does not have to be modified in cases where artificial substances are used as antifriction material in the bearings.

The attachment of the antifriction material to the shaft is effected, in the case of metallic antifriction materials, either by casting them directly round the journal zone of the shaft or, better still, by shrinking on, or screwing on rings, either made in one piece or divided radially at a number of points and either carrying the antifriction material on their external peripheries or made entirely of such material. Rotation of the antifriction material on the shaft can be prevented by initial grip on the periphery (as by shrinking), by keying, by splining or by other means. Detachable securing means, such as keying or splining naturally facilitate and cheapen the replacement of damaged antifriction members.

For antifriction substances in the nature of artificial resins, for which filling materials can be produced in the form of bands (linen, paper, thin veneers) the winding on of the bands under heavy pressure is suggested. Any subsequent hardening of the artificial substances which may be necessary requires such low temperatures that no harmful structural alteration in the material of the shaft can take place. Pressing and subsequent hardening have the same object, that is to say, to effect such preliminary compressing or compacting of the inherently soft artificial substances that permanent deformation thereof under load cannot occur subsequently. Any convenient known means (either frictional or positive) may be adopted for preventing the rotation of the antifriction material relatively to the shaft.

I claim:

1. In a machine shaft, a journal consisting of a peripherally enveloping layer of initially moldable synthetic resin fixed on said shaft, said layer presenting externally a smooth cylindrical anti-friction surface and including an internal reenforcement comprising a continuous strip of non-moldable porous material.

2. The method of producing a bearing surface on a machine shaft, said method consisting in winding upon said shaft a band of porous material carrying a plastic synthetic resin, compacting and molding the winding and resin to produce a smooth external surface of the resin and hardening the resin.

3. An antifriction shaft journal bearing embodying a bearing surface of antifriction material fixed on the shaft, said antifriction material comprising encircling layers of fibrous material and a hardened synthetic resin enveloping said fibrous material.

ERNST GILBERT.